United States Patent
Vijayasankar et al.

(10) Patent No.: US 9,379,773 B2
(45) Date of Patent: Jun. 28, 2016

(54) PHASE DETECTION IN POWER LINE COMMUNICATION SYSTEMS

(75) Inventors: Kumaran Vijayasankar, Dallas, TX (US); Ramanuja Vedantham, Allen, TX (US); Tarkesh Pande, Dallas, TX (US); Il Han Kim, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 853 days.

(21) Appl. No.: 13/593,159

(22) Filed: Aug. 23, 2012

(65) Prior Publication Data

US 2013/0051446 A1    Feb. 28, 2013

Related U.S. Application Data

(60) Provisional application No. 61/526,769, filed on Aug. 24, 2011.

(51) Int. Cl.
*H04B 3/54* (2006.01)
*H04L 12/26* (2006.01)

(52) U.S. Cl.
CPC ............ *H04B 3/54* (2013.01); *H04B 2203/542* (2013.01); *H04B 2203/5408* (2013.01); *H04B 2203/5416* (2013.01); *H04B 2203/5466* (2013.01)

(58) Field of Classification Search
CPC ............. H04B 3/54; H04B 2203/5408; H04B 2203/5416; H04B 2203/542; H04B 2203/5466
See application file for complete search history.

(56) References Cited

U.S. PATENT DOCUMENTS

| | | |
|---|---|---|
| 7,893,680 B2 * | 2/2011 | Thurlow et al. ............... 323/300 |
| 2010/0316140 A1 * | 12/2010 | Razazian et al. ............. 375/257 |
| 2011/0012430 A1 * | 1/2011 | Cheng et al. .................... 307/82 |

OTHER PUBLICATIONS

Sendin et al., "Strategies for PLC Signal Injection in Electricity Distribution Grid Transformers", Int'l Symposium on Power Line Communications and its Applications (IEEE, 2011).
Canals et al., "Making Smart Metering Real. Deploying PRIME Based Networks", available at http://www.meteringsolutions.ziv.es/documentacion/papers/Deploying-PRIME-based-networks-JIEEC2011.pdf.
"PRIME Technology Whitepaper: PHY, MAC and Convergence layers", v.1.0 (PRIME Project, 2008).
"Smart Metering" brochure (Texas Instruments, 2009).
Dabak et al., "Channel modeling of medium to low voltage links for AMI applications of PLC" (Texas Instruments, Jun. 2012).
(Continued)

*Primary Examiner* — Jared Fureman
*Assistant Examiner* — Aqeel Bukhari
(74) *Attorney, Agent, or Firm* — Steven A. Shaw; Frank D. Cimino

(57) ABSTRACT

Phase detection between service nodes in a as "PRIME" ("PoweRline Intelligent Metering Evolution") communications network, in which the service nodes are connected to one phase of a three-phase power distribution network. A service node joining a sub-network receives packet data units from other service nodes in the sub-network, including those that can potentially serve as a switch node to which the joining service node can register. The joining service node measures an elapsed time between a zero crossing of the AC power waveform at its phase and the start of a frame in the received packet data units. This elapsed time is compared with a similar zero crossing gap communicated by other service nodes in the packet data units, to identify the relative phases to which the two service nodes are connected.

17 Claims, 6 Drawing Sheets

(56) References Cited

OTHER PUBLICATIONS

Kim et al., "Evaluating the low-frequency power-line communications channel in Rural North America" (Texas Instruments, Jun. 2012).
Draft Specification for PoweRline Intelligent Metering Evolution, R1.3.6 (PRIME Alliance TWG).
Underwood et al., "Implementation of a Three-Phase Electronic Watt-Hour Meter Using the MSP430F471xx", Application Report SLAA409A (Texas Instruments, Jun. 2009).
Monnier, "TI Delivers Flexible Power Line Communications Solutions" (Texas Instruments, 2010).
"Power Line Communication for Lighting Applications Using Binary Phase Shift Keying with a Single DSP Controller", Application Report SPRAAD5 (Texas Instruments, 2006).
Lu et al., "Developing robust power line communications (PLC) with G3" (Texas Instruments, Jun. 2012).
U.S. Appl. No. 13/531,324, filed Jun. 22, 2012, entitled "Beacon Selection in Communication Networks".

* cited by examiner

PHASE DETECTION IN POWER LINE COMMUNICATION SYSTEMS

CROSS-REFERENCE TO RELATED APPLICATIONS

This application claims priority, under 35 U.S.C. §119(e), of Provisional Application No. 61/526,769, filed Aug. 24, 2011, incorporated herein by this reference.

STATEMENT REGARDING FEDERALLY SPONSORED RESEARCH OR DEVELOPMENT

Not applicable.

BACKGROUND OF THE INVENTION

This invention is in the field of network communications. Embodiments of this invention are directed to synchronization of network devices in a power line communication network.

For many years, electrical utilities determined customers' usage of power over each billing period by way of a human visually reading dials or displays on a power meter at customer locations. This task consumes personnel and vehicle resources, is prone to human error, and provides only the periodic information of power usage since the previous reading. In recent years, the meter reading task has been made more efficient by the deployment of meters with wireless transmission capability, allowing the human meter reader to read the current meter state "from the curb", greatly improving the efficiency of the process and enabling more flexible placement of the meter (e.g., in a secure location). However, the information available by this wireless approach is still limited to periodic snapshots of the current meter state.

In today's economy especially, both industrial and residential power consumers have become more aware of and concerned over the cost of the electrical power that they consume. Utilities have experienced ever-increasing costs of adding production capacity, and as such are taking action to reduce peak demand levels, for example during late afternoon on hot summer days. In many markets, the electrical power industry has been deregulated to some extent, placing competitive pressure on retailers of electrical power. The mutual concern over electrical energy usage by utilities and their customers has provided an incentive for both to consider the implementation of "smart grid" technologies, including such actions as demand-based pricing, control of customer power usage from the utilities (in exchange for a reduced rate), remote control of power usage by the customer (e.g., lighting control, building automation, etc.) and the like. But these technologies require more frequent communication between the power meter at the consumer and the utility than the monthly meter reading, and require bidirectional communication between the meter and the utility.

Various technologies for power line communication ("PLC") have been proposed and implemented. These PLC technologies involve the modulation of the alternating current (AC) power sinusoid with higher frequency signals bearing the information payload. This approach avoids the need for installation of an additional communications facility, such as twisted-pair or coaxial wire, and longer-range wireless transceivers. Because the volume of information to be transmitted is not overwhelmingly large, conventional PLC technologies are implemented as low-frequency narrow-band power line communications (LF NB PLC), which can be implemented at relatively low cost, requires relatively low power, and is bandwidth-efficient. The PLC communications can be extended into a local area network within the consumer location, enabling monitoring and control of thermostats, motor-driven equipment, solar panels, gas and water meters, and the like.

A recent approach to low-frequency narrow-band power line communications is known in the art as "PRIME" ("PoweRline Intelligent Metering Evolution"). PRIME PLC is an open standard defined in the physical ("PHY") and media access control ("MAC") protocol layers described in IEEE Standard 802.16. The PHY layer implements orthogonal frequency division multiplexing (OFDM) in the "CENELEC-A" frequency band, which is reserved in Europe for electricity suppliers. Under the current draft of the PRIME standard, namely "Draft Specification for PoweRline Intelligent Metering Evolution", version R1.3.6, available from Prime Alliance TWG, 97 subchannels are assigned between 41992.1875 Hz and 88867.1875 Hz, one of those subchannels serving as a pilot subchannel and the others carrying bidirectional communications. These subchannels are modulated in OFDM fashion, according to a differential phase-shift-keying constellation (e.g., D8PSK). A PRIME subnetwork includes a single Base Node, typically at the transformer station for a neighborhood, and multiple Service Nodes in a tree topology for which the Base Node is the root node. Service Nodes serving as the "leaves" for the tree network (i.e., those Service Nodes that are not supporting a downstream node) are in a Terminal state, while Service Nodes at branch points in the tree structure are in a Switch state. Service Nodes begin in a disconnected state, and request promotion first to the Terminal state, followed by promotion to a Switch state upon the logical connection of another Service Node to it.

As known in the art, PRIME communications are arranged in data frames, specifically in "superframes" that each consist of a group of frames (e.g., thirty-two frames). PRIME PLC communications are beacon-based, in the sense that the Base Node and each Switch Node periodically transmits a "beacon" at a time slot at the beginning of particular frames within the superframe, as assigned by the Base Node. Each Switch Node retransmits all received traffic frames, transmitting its beacon in those frames in which it has been assigned a beacon slot. Frames received at a Switch Node other than its assigned frames (i.e., traffic in branches of the tree network to which the Switch Node does not belong) are not retransmitted by that Switch Node, to optimize traffic flow. Each Service Node in the tree network is able to sense the start of each frame, to synchronize communications.

The PRIME PLC standard and specification can be applied to either single-phase or three-phase power distribution networks. In the three-phase implementation, it is permitted for the Base Node to inject the PLC signal on all three phases, but the relevant specification significantly limits the signal power in that case. As such, Base Nodes in conventional PRIME networks typically inject the communications signal to only one of the three available phases, as a modulated signal on the selected phase relative to the neutral. By virtue of the close proximity of the power line conductors for the three phases, the injected PLC signal parasitically couples (i.e., capacitively, inductively, or both) to the other two phases. The parasitically coupled signals at the other two phases are necessarily attenuated relative to the injected signal. The extent of the attenuation can vary widely, but is typically being on the order of 10 dB.

Typical PLC Service Nodes are implemented as modems deployed at the customer location that are connected to only one phase of the three-phase power distribution network. This single phase may be the only phase deployed to the customer location (in the case where the customer does not have any three-phase equipment to be powered), or may be one of the three available phases received at that location. If the phase to which the Service Node is coupled is not the phase to which the Base Node PLC signal is directly injected, the Service Node will receive a less-than-optimal signal, due to the attenuation of the parasitic coupling between phases.

By way of further background, copending and commonly assigned U.S. patent application Ser. No. 13/531,324, filed Jun. 22, 2012, entitled "Beacon Selection in Communication Networks", and incorporated herein by this reference, describes a communications network and method of operating the same in which a new Service Node joining an existing PRIME network associates itself with a selected one of a plurality of Switch Nodes. As described therein, each Service Node can "see" traffic from multiple Switch Nodes, and can, on joining the network, select one of those Switch Nodes (including the Base Node) to which to register itself. Application Ser. No. 13/531,324 describes several methods for selecting a Switch Node during registration of a new Service Node.

BRIEF SUMMARY OF THE INVENTION

Embodiments of this invention provide a power line communication (PLC) node device and method of operating the same that detects the phase at which another node in the network is operating for PLC purposes.

Embodiments of this invention provide such a device and method in which the phase detection is carried out in the media access control (MAC) protocol layer.

Embodiments of this invention provide such a device and method that enables optimized selection of one of several available Switch Nodes, by a Service Node upon joining a PLC network.

Embodiments of this invention provide such a device and method that enables improved network management based on identified phase relationships of the Service Nodes in the network.

Embodiments of this invention provide such a device and method compatible with PLC communications according to the PRIME standard, and with other high-performance communications techniques such as orthogonal frequency division multiplexing (OFDM) modulation.

Other advantages of embodiments of this invention will be apparent to those of ordinary skill in the art having reference to the following specification together with its drawings.

Embodiments of this invention may be implemented into PLC modem devices and functions, and methods of operating the same, in which zero crossing detection identifies a delay time between a zero crossing time of an alternating current power waveform and the beginning of a PLC frame. Within the communications frame, the device receives, from one or more other network nodes, data indicating the delay time detected by those network nodes. The device compares its own identified delay time with the received delay times, and determines from that result a phase relationship between itself and one or more network nodes.

DETAILED DESCRIPTION OF THE INVENTION

This invention will be described in connection with its embodiments, specifically as implemented into an example of power line communications (PLC) according to the "PoweRline Intelligent Metering Evolution" (PRIME) PLC communications standard, as it is contemplated that this invention will be especially beneficial when implemented in such an environment. It is further contemplated, however, that applications of this invention can provide benefits in other communications environments and protocols. Accordingly, it is to be understood that the following description is provided by way of example only, and is not intended to limit the true scope of this invention as claimed.

Figure 1:
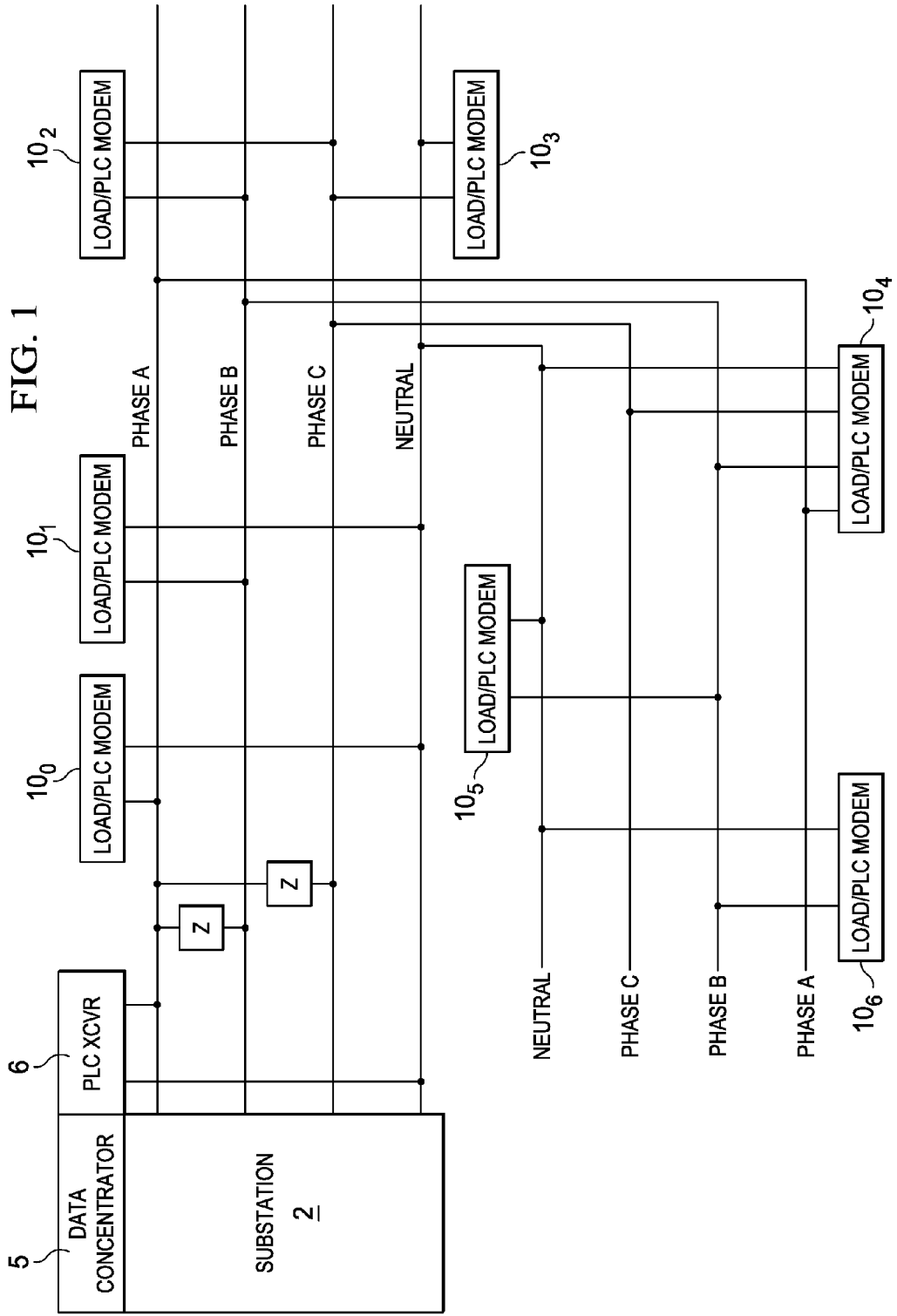
FIG. 1 is an electrical diagram, in block form, of an electrical power sub-grid in which embodiments of the invention may be implemented.

FIG. 1 schematically, and in a generalized sense, illustrates an electrical power sub-grid in connection with which embodiments of this invention may be implemented. Substation 2 is a conventional transformer power station located in a neighborhood or rural area, which includes the necessary transformers and switches for routing three-phase AC power derived from those high-voltage power distribution lines to local residential and commercial users, shown in FIG. 1 as loads $10_0$ through $10_6$. In the conventional manner, the lower voltage power distributed from sub-station 2 appears on conductors corresponding to three phases A, B, C (each 120° out of phase with one another), relative to a neutral. Each load $10_0$ through $10_6$ is connected to the conductors corresponding to one or more of phases A, B, C and to the neutral conductor. In this example, loads $10_0$ through $10_3$, $10_5$, and $10_6$ are single-phase loads, each connected to one of phases A, B, or C along with neutral, while load $10_4$ is a three-phase load connected to all of phases A, B, C, and to neutral.

A power line communication (PLC) network is implemented in the sub-grid of FIG. 1, according to embodiments of this invention. Data concentrator 5 resides at sub-station 2, and serves as a bidirectional gateway between communications functions at one or more of loads 10 and a wide-area network (not shown) beyond substation 2; as such, all incoming and outgoing communications relative to the PLC network on this sub-grid pass through data concentrator 5. Each of loads $10_0$ through $10_6$ includes a PLC modem operating as a network node in the PLC network, as will be described in further detail below. Data concentrator 5 also manages communications among the various network nodes on this sub-grid, as will also be described in further detail below.

Data concentrator 5 is associated with PLC transceiver 6, which is connected to one of the three power line phases (e.g., phase A) and to neutral, as shown in FIG. 1. In that function, PLC transceiver 6 transmits modulated signals at phase A and receives modulated signals from phase A, according to the selected communications protocol. For the example of communications according to the PRIME standard, PLC transceiver 6 includes, on its transmit side, the appropriate functionality for encoding data to be transmitted to loads 10, and modulating the encoded data according to an orthogonal frequency division multiplexing (OFDM) approach for summing with the 50 or 60 Hz AC power at phase A; conversely, on its receive side, PLC transceiver 6 includes the appropriate functionality for demodulating OFDM signals overlaid on the AC power waveform, and decoding the demodulated signals to acquire data communicated from the PLC modems at loads 10.

As mentioned above, it is typical in modern PRIME PLC networks for PLC transceiver 6 to connect directly to only one of the three power phases. The close proximity of the physical conductors for the three power phases to one another parasitically couples the modulated PLC signals from the direct connected phase to the other two phases. This parasitic coupling is illustrated in FIG. 1 by the coupling of phase A to phases B and C by a reactance Z in each case. As such, the signals driven onto phase A appear on phases B and C, but necessarily attenuated by reactance Z, for example by on the order of 10 dB.

Figure 2:
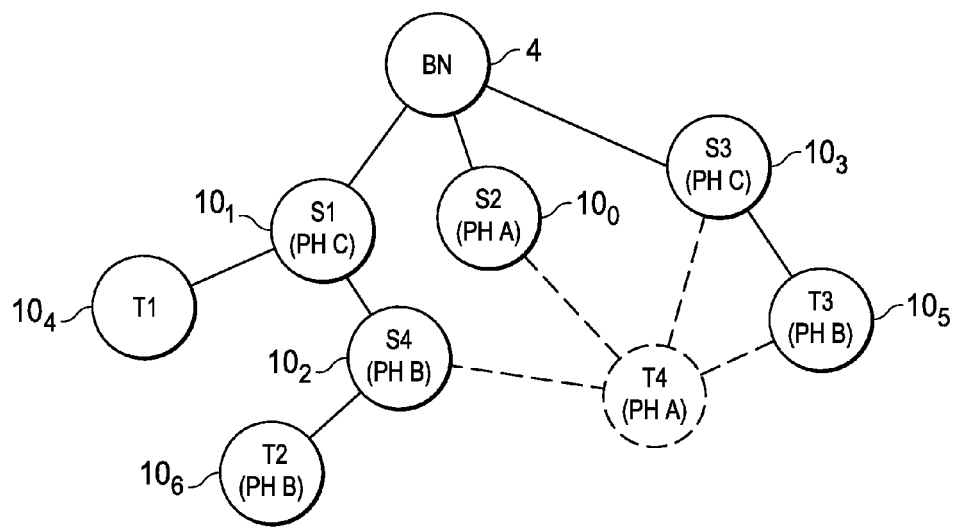
FIG. 2 is an electrical diagram, in block form, of a power line communications (PLC) network topology in the sub-grid of FIG. 1, in which embodiments of the invention may be implemented.

According to the PRIME communications standard and protocol, the logical architecture of the communications sub-network may differ from the power distribution architecture of the power sub-grid on which it resides. FIG. 2 illustrates an example of such a PRIME PLC sub-network implemented on the sub-grid of FIG. 1, in which the network nodes are logically arranged in a "tree" network. Data concentrator 4 serves as the Base Node of this sub-network, at the root of the tree network. The Base Node provides connectivity to a wide area network outside of the sub-network, and also manages resources and connections within the sub-network. Typically in the PRIME protocol, the Base Node of a sub-network is the initial network node, with which other downstream Service Nodes register themselves upon enrollment in the sub-network.

Each of the PLC modems of loads 10 that are actively communicating over the sub-network of FIG. 2 are considered Service Nodes according to the PRIME communications protocol. PRIME Service Nodes can reside in one of three states: Disconnected, Terminal, and Switch. A Service Node begins its communications within a sub-network in the Disconnected state, and in that state, searches for an operational network to which it can be registered. Once registered in a PRIME network, the Service Node enters the Terminal state, in which it is capable of transmitting and receiving traffic to and from the PLC network, but in which it is not capable of switching the traffic of any other Service Node. As such, Service Nodes in the Terminal state (i.e., Terminal Nodes) reside at the end of a branch of the tree topology; in the example of FIG. 2, Service Nodes T1, T2, and T3 at loads $10_4$, $10_6$, and $10_5$, respectively, are in the Terminal state. A Service Node in a Terminal stage is "promoted" to the Switch state upon a registration request from another Service Node that wishes to connect itself into the sub-network via that Service Node. In the Switch state, a PRIME Service Node can perform all transmission and receipt functions of the Terminal state, and can also forward data traffic to and from other devices in the sub-network. A Service Node in the Switch state (i.e., a Switch Node) appears as a branch point in the PRIME tree topology. In the example of FIG. 2, Service Nodes S1, S2, S3, and S4 at loads $10_1$, $10_0$, $10_3$, and $10_4$ are in the Switch state. As shown for the example of Service Nodes S1 and S4, a Switch Node can reside in a level downstream from another Switch Node, if a Terminal Node (e.g., Service Node T2) connects through it. For example, referring to the Base Node as level 0, Switch Nodes S1, S2, S3 reside in level 1 of the sub-network of FIG. 2, with Switch Node S4 and Terminal nodes T1 and T3 residing in level 2; Terminal Node T2, which connects into the sub-network through Switch Node S4 (promoting Service Node S4 to the Switch state), resides in level 3.

Figure 3:
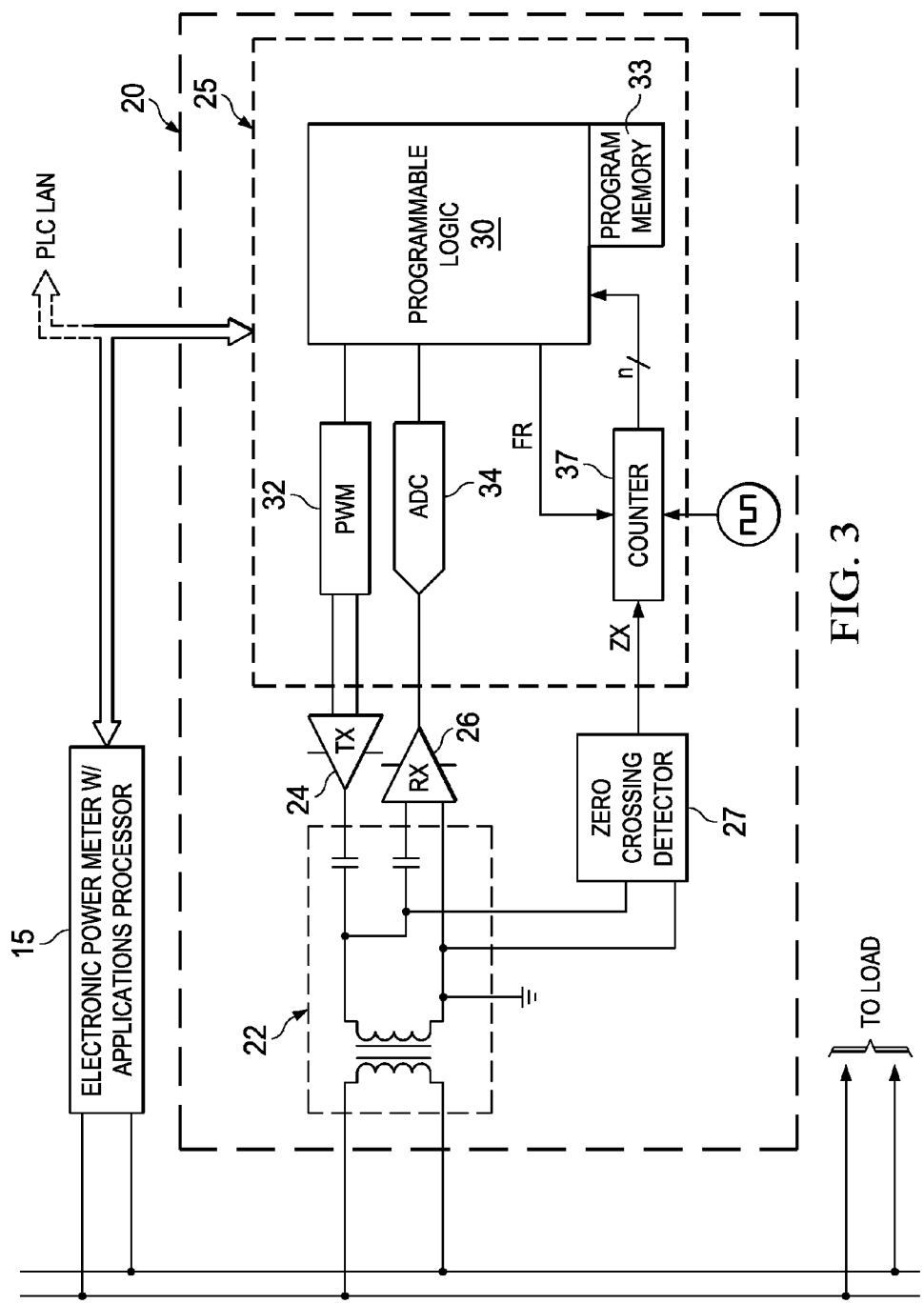
FIG. 3 is an electrical diagram, in block form, of a PLC modem device constructed according to embodiments of this invention.

FIG. 3 schematically illustrates the construction of circuit functions deployed at one of loads 10 in the sub-grid of FIG. 1, according to embodiments of this invention. As shown in FIG. 3, load 10 is associated with an electronic power meter 15, which includes the appropriate circuits and functions including one or more applications processor, for acquiring and processing data regarding consumption of electrical power by its load 10, including such information as time of day, peak power consumption rate, average consumption, and the like. Commercially available integrated circuits suitable for implementation as electronic power meter 15 include the MSP 430 E-Meter "system on a chip" (SoC) available from Texas Instruments Incorporated, and also the implementation as electronic power meter 15 include the MSP 430 E-Meter "system on a chip" (SoC) available from Texas Instruments Incorporated, and also the STELLARIS CORTEX M3 applications processor available from Texas Instruments Incorporated. Other commercially available integrated circuits suitable for use in connection with these functions may alternatively be used, as known in the art.

According to embodiments of this invention, PLC modem 20 transmits and receives modulated signals in the PLC sub-network, as communicated over the power line that supplies load 10. In this implementation, PLC modem 20 is capable of transmitting data over the sub-network including data acquired and processed by electronic power meter 15; conversely, PLC modem 20 can receive control data, data access requests, and the like from the outside of the sub-network via the Base Node, from the Base Node itself, or from other Service Nodes in the sub-network, by way of which the operation of electronic power meter 15 can be controlled or interrogated. As suggested in FIG. 3, if power line communications are being used as wide area network (e.g., Internet) communications from the location of load 10, PLC modem 20 can also manage, transmit, and receive communications over a local area network (LAN) at that location, serving as a gateway to the Internet.

As shown in the example of FIG. 3, PLC modem 20 is coupled to phase A and to the neutral in the power sub-grid of FIG. 1. This coupling is bidirectional, with transmit driver 24 and receiver 26 each coupled to the power conductors in the conventional manner, via L-C network 22. PLC modem 20 also includes PLC controller 25, which may be implemented, for example, by a single-chip programmable processor having the computational capacity of the TMS3200F28xx 32-bit PLC controller available from Texas Instruments Incorporated. PLC controller 25 includes such conventional functions as pulse width modulator 32, which receives modulated signal data from programmable logic 30 in PLC controller 25 and generates pulse width modulated pulses to transmit driver 24. On the receive side, PLC controller 25 includes analog-to-digital converter (ADC) function 34, which converts the analog signal received by receiver 26 into digital data. Programmable logic 30 is provided for processing data to be transmitted via pulse width modulator 32 and transmit driver 24, and data received via receiver 26 as converted to digital by ADC 34, both by executing sequences of program instructions stored in program memory 33. Program memory 33 may reside within PLC controller 25, or external to PLC controller 25 within or outside of PLC modem 20. PLC controller 25 also includes a digital interface by way of which it can communicate with electronic power meter 15 and such other circuits and functions at the location of load 10 that may be set up in a LAN environment.

According to embodiments of the invention, PLC modem 20 includes zero crossing detector 27. As will be described in further detail below, zero crossing detector 27 is a conventional circuit that issues a pulse or level transition on line ZX in response to the voltage at phase A crossing a selected reference level, for example ground. The reference level may vary from ground, but it is useful, in connection with this invention, that the reference level applied by zero crossing detector 27 is at about the DC level of the AC power waveform. Line ZX output by zero crossing detector 27 is connected to an input of counter 37; counter 37 also receives a high-frequency system clock at a clock input, and another control input on line FR from programmable logic 30. The contents of counter 37 can be read by programmable logic 30 on its request or periodically, as shown in FIG. 3. While counter 37 is shown as incorporated within PLC controller 25, it may alternatively be provided external to controller 25; further in the alternative, it is contemplated that those skilled in the art having reference to this specification will recognize that other circuitry may be substituted for counter 37 in the measurement of certain delay times according to embodiments of this invention, such other circuitry also being within the scope of the claims in this case. The operation of PLC modem 20 according to embodiments of this invention will be described in further detail below.

Figure 4:
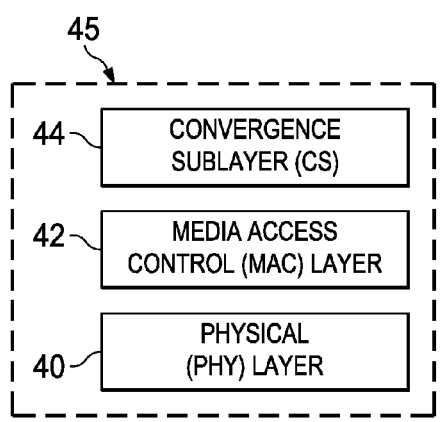
FIG. 4 is a protocol diagram of protocol levels implemented in a PLC network and device according to embodiments of the invention.

According to the PRIME PLC protocol, lower layers of the familiar Open Systems Interconnect (OSI) reference model of network communications architecture are implemented by PLC modem 20 and its counterparts elsewhere in the PLC sub-network, within control and data plane 45 as shown in FIG. 4. These lower levels include physical (PHY) layer 40, media access control (MAC) layer 42, and convergence sub-layer (CS) 44. According to the PRIME standard, PHY layer 40 carries out the transmission and receipt of MAC layer 42 packet data units (PDUs) between neighboring Service Nodes in the PLC sub-network. For example, PHY layer 40 includes the specific functions of applying a cyclic redundancy code to baseband data forwarded to it by MAC layer 42, error correction encoding, scrambling and interleaving of the encoded data, assigning the encoded data to sub-carriers within the OFDM bandwidth being used, and performing OFDM modulation followed by application of a cyclic prefix to reduce intersymbol interference. Conversely, PHY layer 40 applies the reverse sequence of inverse operations to those performed on the transmit side, upon data signals received from the sub-network, and forwards the demodulated and decoded data to MAC layer 42. MAC layer 42 provides core functionalities similar to MAC layers in other network architectures, including system access, bandwidth allocation, connection management, topology resolution, and the like. CS layer 44 communicates with MAC layer 42, and performs the function of classifying traffic with the proper MAC connection, mapping traffic into MAC service data units (SDUs), payload header suppression, and the like.

Figure 5:
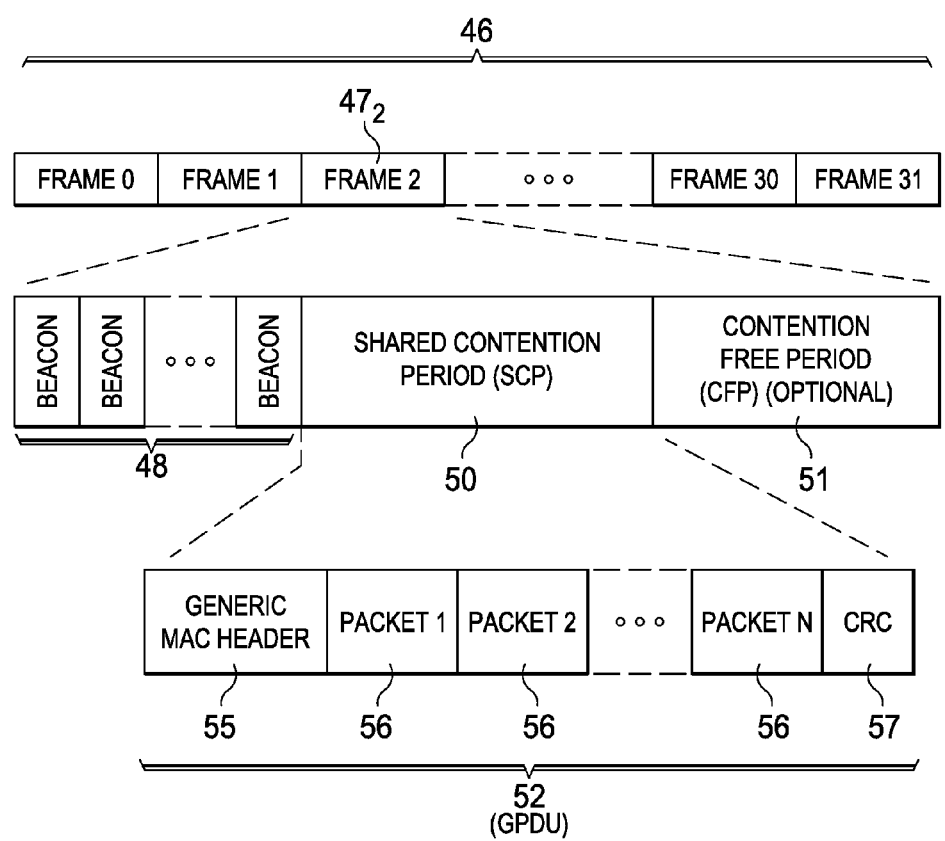
FIG. 5 is a diagram of the arrangement of frames within a "PoweRline Intelligent Metering Evolution" (PRIME) PLC communications protocol, according to embodiments of this invention.

According to embodiments of this invention, detection of the relative phases to which Service Nodes are connected is carried out largely in MAC layer 42, with some of the data used in such phase detection communicated within certain frames of PDUs communicated over the PLC sub-network. FIG. 5 illustrates the arrangement of frames according to the PRIME standard, as modified by embodiments of this invention as will be described in further detail below.

Communications according to the PRIME specification are frame-based, with groups of frames arranged into "superframes". FIG. 5 illustrates the example of superframe 46, which contains thirty-two frames 47 in sequence. As shown by the example of frame $47_2$ of superframe 46, each frame 47 includes from one to five beacon slots 48, followed by shared contention period (SCP) 50, followed by optional contention free period (CFP) 51. According to the PRIME specification, the Base Node and all Switch Nodes are required to periodically broadcast a beacon packet data unit (BPDU) in an assigned beacon slot 48 within assigned frames 47 of superframe 46. The first beacon slot 48 within each frame 47 is assigned to the Base Node. As Service Nodes are promoted to the Switch state, the Base Node will assign one or more beacon slots 48 within specific frames 47 to that newly-promoted Switch Node. Each Switch Node is required to retransmit those frames to which it, and thus any Switch Node connected through it, is assigned a beacon slot 48. The five beacon slots 48 within each frame 47 allow up to four levels of Switch Nodes to reside on a branch of the tree topology. Each beacon packet data unit transmitted within a beacon slot 48 consists of eighteen bytes, and includes such information as identification of the packet unit as a beacon, indication of the quality of connectivity with the Base Node, identification of the Switch Node transmitting this BPDU, other control information pertaining to the BPDU, and a cyclic redundancy code value. Certain bit positions within the structure of the BPDU are unused or reserved in the PRIME specification; some of those bit positions are utilized in embodiments of this invention, as will be described below.

Shared contention period 50 is the portion of each frame 47 in which the various Service Nodes in the sub-network transmit communications data, in the form of packet data units. As neither time-multiplexing nor frequency-multiplexing is performed in PRIME PLC, packet collisions may occur within shared contention period 50; an arbitration mechanism is provided to resolve such conflicts. FIG. 5 illustrates the arrangement of generic packet data unit (GPDU) 52 as may be communicated within shared contention period 50. GPDU 52 in this example includes generic MAC level header 55, followed by a variable number of payload packets 56, trailed by CRC value 57. Generic MAC header 55 includes such information as an indication of its identity as a packet (i.e., identifier as a GPDU), an indicator of the direction of communication (uplink or downlink), indication of the levels in the sub-network of the communication contained in GPDU 55, followed by a check sequence for header 55 itself. Certain bit positions within the structure of GPDU 55 are unused or reserved according to the PRIME specification; some of those bit positions are utilized in embodiments of this invention, as will be described below.

As discussed above in connection with the example of FIGS. 1 and 2, not all Service Nodes are directly connected to the same power phase (e.g., phase A) to which the Base Node (i.e., PLC transceiver 6) is directly connected. Those Service Nodes that are connected to a different phase (e.g., phase B or phase C) thus necessarily receive an attenuated version of the PLC signals from the Base Node, attenuated by reactance Z between those phases. Similarly, some Service Nodes (e.g., Switch Node S4) may connect into the PLC sub-network through a Switch Node (e.g., Switch Node S1) that is connected to a different phase, thus inserting additional attenuation in the signal between that Service Node and its associated Switch Node. All other things being equal, the quality of PLC communications will be improved for a Service Node that is connected to the same phase at its Switch Node (or at the Base Node, if the Service Node is at level 1 of the sub-network).

According to the PRIME protocol, a Service Node that is joining the PLC sub-network, either as an initial connection or as a re-connection (including the re-establishing of a network connection after a dropped connection), begins by listening to the PLC channel for a period of time to detect beacons from Service Nodes already on the sub-network. Based on the attributes of those received beacons, the joining Service Node decides which Switch Node (or, alternatively, a Terminal Node that will become promoted to a Switch Node) to which to connect. The above-incorporated copending application Ser. No. 13/531,324 describes algorithms for making such a selection.

According to embodiments of this invention, PLC modem 20 (FIG. 3) includes circuitry and functionality for detecting the relationship between the power phase to which it is connected, and the power phase to which other Service Nodes are connected, for use in selecting a Service Node through which to connect into the sub-network. Specifically, embodiments of this invention enable PLC modem 20 to identify those Service Nodes that are connected to the same phase as modem 20 itself is, and for which communications would thus not be attenuated due to being connected to different phases. In some embodiments of the invention, PLC modem 20 can identify the specific one of the three phases to which it is itself connected; it is contemplated that communication of that information to the Base Node can be used in network management, for example by re-arranging the network topology to minimize inter-phase attenuation.

Figure 6:
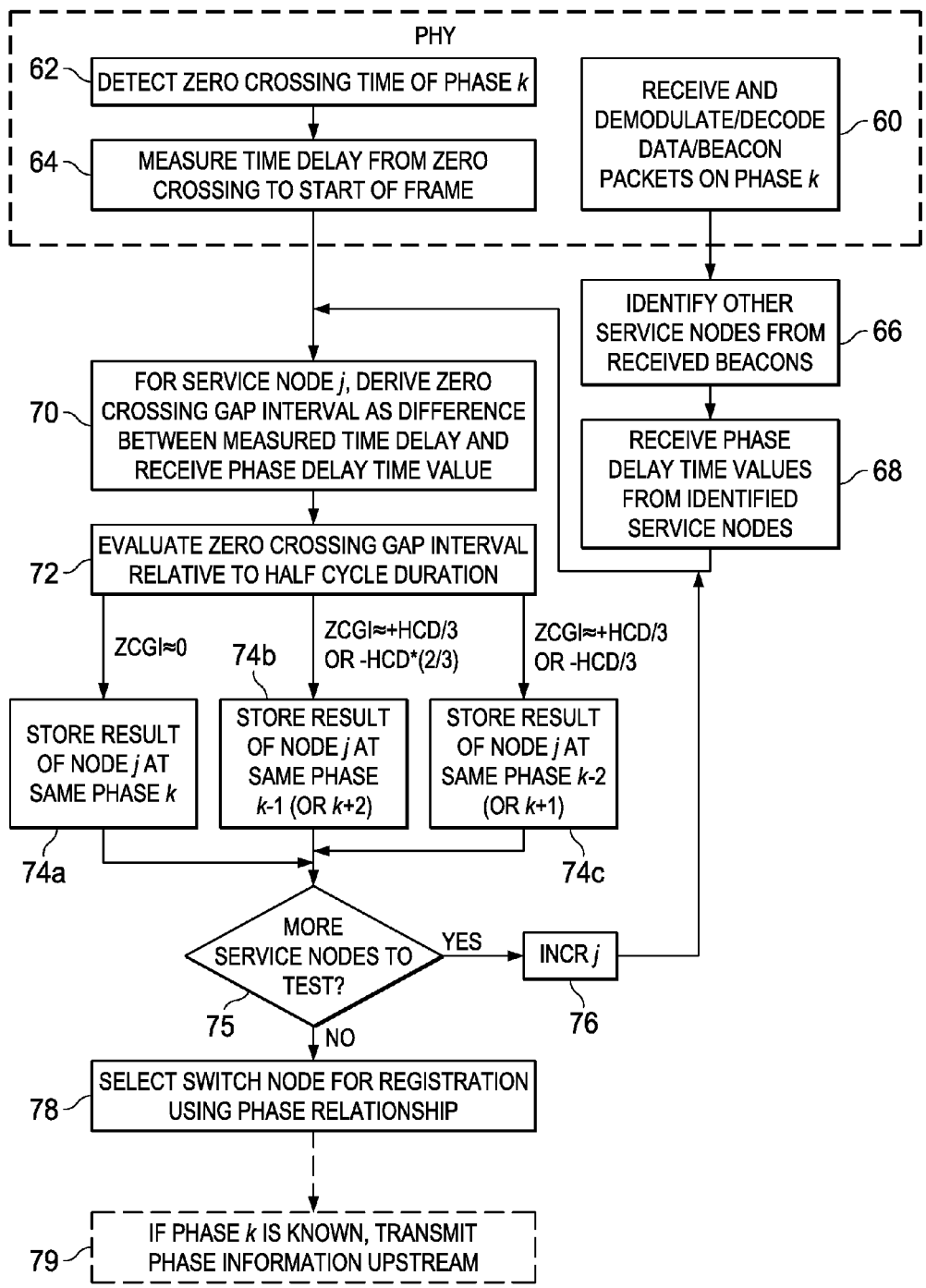
FIG. 6 is a flow diagram illustrating the operation of embodiments of the invention.

Referring now to FIG. 6, the operation of PLC modem 20 in detecting the phase relationship between itself and other Service Nodes, according to embodiments of the invention, will now be described. For purposes of this description, PLC modem 20 will be described as being connected to power phase k, which is one of the three available phases in a conventional AC power distribution network. For purposes of this description, PLC modem 20 constructed as described above in connection with FIG. 3 will be referred to by way of example. In that implementation, it is contemplated that some if not all of the functions performed by PLC modem 20 in detecting this phase relationship will be performed by programmable logic 30 in executing program instructions stored in and retrieved from program memory 33. As such, program memory 33 is contemplated to store those program instructions that, when executed by programmable logic 30, cause PLC modem 20 to perform the operations described herein relative to FIG. 6. It is contemplated that one skilled in the art, having reference to this specification, will be readily able to implement these operations by way of the appropriate program instructions suitable for execution by the specific implementation of programmable logic 30 used, without undue experimentation.

This operation begins with process 60 in which PLC modem 20 receives, demodulates, and decodes beacon and data packets that it receives from its connection to power phase k. Process 60 is performed in the PHY protocol layer, and involves conversion of the incoming analog signal to the digital domain by ADC 34, demodulation of the OFDM digital data, and decoding to recover the data contents of the received packets.

PLC modem 20 also performs process 62, in which its zero crossing detector 27 detects the time at which the AC power waveform on phase k crosses a zero level (i.e., the level of its DC voltage). And in process 64, PLC modem 20 begins measuring the time elapsed from this zero crossing time to the time of the start of the next frame following the zero crossing time. As known in the art in connection with the PRIME PLC standard, the Service Nodes in a sub-network are synchronized to frame boundaries, as a result of the synchronized beacons. According to embodiments of this invention, the frame boundary at the start of a frame is used as a reference point for phase detection. Similarly, in other frame-based communications protocols, receive functions are able to detect and identify frame boundaries; frame synchronization between transmitter and receiver is of course necessary to carry out the communications function.

Alternatively, PLC modem 20 could execute process 62 by measuring the time elapsed from the start of a received frame until the next zero crossing of the power waveform.

Figure 7:
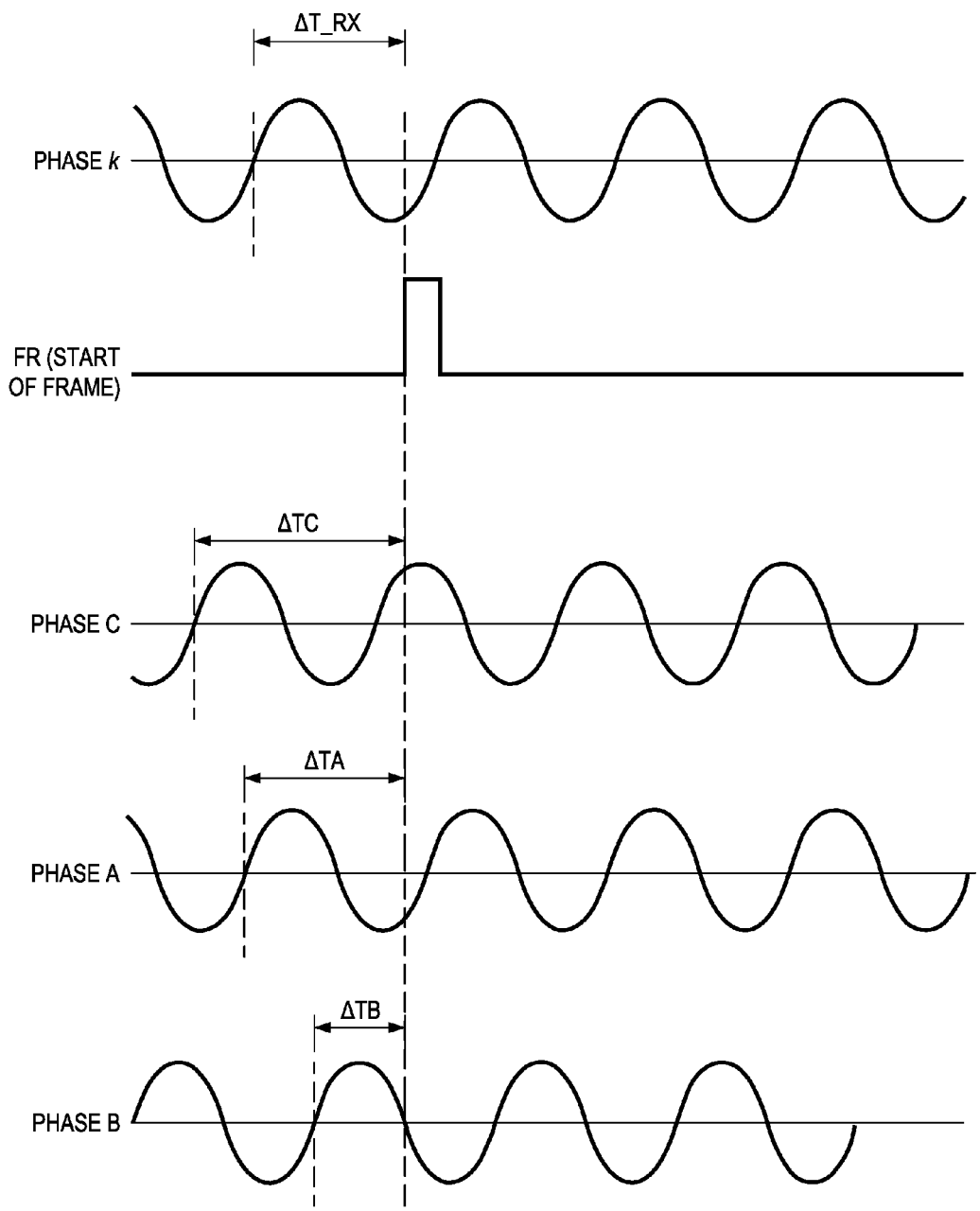
FIG. 7 is a timing diagram illustrating an example of embodiments of the invention.

Referring to the example of PLC modem 20 in the block diagram of FIG. 3, for the case in which elapsed time is measured from a zero crossing time, process 62 is carried out by zero crossing detector 27 issuing a pulse or level transition on its output line ZX in response to detecting that zero crossing. In this example, output line ZX from zero crossing detector 27 is received by counter 37, which in turn initiates measurement process 64 by resetting its contents and counting clock pulses. Frame boundaries are detected upon demodulation and decoding of the received OFDM data, as performed by programmable logic 30 in this example; on detection of a start-of-frame event, programmable logic 30 issues a signal on line FR to counter 37, causing it to store and output, or directly output, its current contents to programmable logic 30. The contents of counter 37 output in response to the start-of-frame thus correspond to the elapsed time between the last zero crossing of the phase k power waveform and the next start-of-frame received. For purposes of this description, that elapsed time (as quantized to a digital value) will be referred to as the "local" zero crossing gap. FIG. 7 illustrates elapsed time $\Delta T\_RX$ between a zero crossing event and the pulse on line FR indicating the start of a frame as received at PLC modem 20. According to embodiments of this invention, processes 62, 64 are also carried out in the PHY protocol layer, as indicated in FIG. 6. It is of course contemplated that other hardware and software approaches may alternatively be implemented for carrying out processes 62, 64. The remaining processes of FIG. 6 are contemplated to be carried out in the MAC protocol layer, according to this embodiment of the invention.

In process 66, programmable logic 30 analyzes beacon slots 48 in the received data frames to identify other Service Nodes in the PLC sub-network, including those through which PLC modem 20 can connect. From beacon packet data units (BPDU) transmitted by Switch Nodes, or from headers of generic packet data units (GPDU) transmitted by Service Nodes generally, or both, programmable logic 30 then executes process 68 to acquire phase delay time data for its neighboring Service Nodes, according to embodiments of the invention.

As mentioned above, certain bits within BPDUs transmitted by Switch Nodes in their assigned beacon slots, and also certain bits within the headers of GPDUs transmitted by Service Nodes generally, are either unused or reserved under the current PRIME standard. According to embodiments of this invention, those bits are used by Service Nodes to communicate phase delay time data as measured by those Nodes, for example in similar fashion as described above relative to processes 62, 64. The number of bits used to communicate this phase delay time data depends on the desired granularity. For example, reserving one value (e.g., all ones) to indicate that phase detection is not supported by an upstream Service Node, seven discrete values of the communicated phase delay time can be communicated by three bits, fifteen discrete values by four bits, etc. Within the PRIME PLC standard, examples of available bits include:

For the three-bit case:
 a) in BPDU (beacon) frames: MSBs 1, 2, and 5 of the first byte; or
 b) in the header of GPDU (generic) frames: MSBs 5, 6, 7 of the first byte.

For the four-bit case:
 a) in BPDU frames: MSBs 0, 1, of the first byte and MSBs 0, 1 of the fifth byte; or
 b) in the header of GPDU frames: MSBs 5, 6, 7, 8 of the first byte.

Other reserved or unused bits in the communicated packet data units may alternatively or additionally be assigned to convey the phase delay time data. In any case, the data communicated via these bits are acquired by programmable logic 30 following demodulation and decoding of the corresponding packet data units. For purposes of this description, the phase delay time value received by PLC modem 20 from an upstream Service Node will be referred to as the "received" zero crossing gap.

In process 70, programmable logic 30 of PLC modem 20 compares the local zero crossing gap for itself as measured in process 64 with the received zero crossing gap of a first Service Node j obtained in process 68. FIG. 7 illustrates the possible nominal values ΔTA, ΔTB, ΔTC of the received zero crossing gap for the three phases A, B, C, respectively, of the power distribution system. Of course, the actual phase delay times as measured by the other Service Nodes will vary due to propagation delays, attenuation in the signal, measurement tolerances, and the like. In addition, the timing of the start-of-frame pulse PR will occur at a different absolute time at each of the Service Nodes, and as such the communicated zero crossing gap from a given Service Node is based on the timing of the start of frame as observed at that Service Node. According to the embodiment of the invention illustrated in FIG. 6, process 70 is performed by programmable logic 30 calculating a zero crossing gap interval (ZCGI) by subtracting the local zero crossing gap from the received zero crossing gap.

In process 72, programmable logic 30 of PLC modem 20 compares the zero crossing gap interval calculated in process 70 with threshold values for the phase difference. According to an embodiment of the invention, these threshold values are defined with reference to a half period (i.e., a half-cycle duration, or HCD) of the power waveform, namely 10 msec for a 50 Hz AC power, and 8.33 msec for 60 Hz AC power. According to an embodiment of the invention, the thresholds applied to process 72 are based on the value HCD/3, considering that three equally spaced phases will have phase differences, relative to one another, of ±(HCD/3) and ±HCD*(⅔). A generous tolerance ϵ (e.g., ±10%) may be applied to each threshold value. In addition, it is useful to consider the polarity of the zero crossing gap interval in this determination. Referring to FIG. 7, for the case in which phase k matches phase A, phase C leads phase A by one phase, and lags phase A by two phases. For purposes of this description, this polarity is based on:

ZCGI=received zero crossing gap−local zero crossing gap

Accordingly, three results are possible from evaluation process 72. In processes 74a, 74b, 74c, the result from this instance of process 72 in evaluating the phase of Service Node j is stored in a memory resource (not shown) accessible to programmable logic 30. If the zero crossing gap interval (ZCGI) calculated in process 72 is 0±ϵ, then phase k is the same phase as the phase to which that other Service Node is connected, and that result is stored in memory in process 74a.

In the example of FIG. 7, this result corresponds to the other Service Node being connected to the same phase A to which PLC modem 20 is connected. A second result corresponds to the ZCGI equal to +(HCD/3)±ϵ or −HCD*(⅔)±ϵ, in which case the other Service Node is connected to one phase in advance of phase k (i.e., phase k−1), and that result is stored in memory in process 74b. In the example of FIG. 7, this result corresponds to the other Service Node being connected to phase C. The third possible result corresponds to the ZCGI equal to either +HCD*(⅔)±ϵ or −(HCD/3)±ϵ, in which case the other Service Node is connected to the phase two phases in advance of phase k (i.e., phase k−2), and that result is stored in memory in process 74c. In the example of FIG. 7, this third result corresponds to the upstream Service Node being connected to phase B.

Following the storing of the detected relative phase of Service Node j in process 74a, 74b, 74c, as the case may be, programmable logic 30 executes decision 75 to determine whether additional Service Nodes remain to be tested. If so (decision 75 returns a "yes"), index j is incremented in process 76, and a next Service Node is analyzed in processes 70, 72, 74 as described above.

If all other Service Nodes identified in process 66 have been analyzed (decision 75 returns a "no"), the results stored in processes 74 can be analyzed in configuration and management of the PLC sub-network. One important use of these results is in the selection, by PLC modem 20 itself in process 78 of FIG. 6, of a Service Node through which to connect upon joining the PLC sub-network. In the example of FIG. 2, new Service Node T4 joining the sub-network is connected to phase A. In this example, new Service Node T4 has identified Switch Nodes S2, S3, and S4, and Terminal Node T3, as Service Nodes to be analyzed. Upon execution of the process described above relative to FIG. 6, new Service Node T4 will have identified that Switch Node S4 is transmitting on the same phase of the power distribution system as that to which PLC modem 20 of new Service Node T4 is connected, and thus its PLC signal as received by new Terminal Node T4 will be less attenuated than the signals from the other analyzed Service Nodes.

While selection process 78 may be made solely on the phase detection results acquired according to this embodiment of the invention, other criteria may also be combined with this phase detection in making the selection of process 78. For example, the results of the phase detection process of FIG. 6 may be included as an additional or alternative criterion within an overall selection scheme, such as that described in the above-incorporated application Ser. No. 13/531,324. Registration of PLC modem 20 as a Terminal Node within the network, through the Service Node selected in process 78, can then commence in the conventional manner, such as described according to the PRIME specification.

The phase detection results acquired according to embodiments of this invention are useful in the selection of a Switch Node, and for other reasons, even if PLC modem 20 does not itself know which of phases A, B, C to which it is connected. In addition, or in the alternative, if PLC modem 20 is programmed or otherwise acquires an indication of the specific one of phases A, B, C to which it is connected, the phase detection process of embodiments of this invention is then capable of identifying the specific ones of phases A, B, C to which the other Service Nodes are connected. For example, referring again to FIG. 7, if PLC modem 20 is connected to phase B, a Service Node with a zero crossing gap that is one phase leading (or two phases lagging) phase B is connected to phase A, and a Service Node with a zero crossing gap that is two phases leading (or one phase lagging) phase B is connected to phase C. In this event, PLC modem 20 can communicate the results of its phase detection, including its own results and those of the other Service Nodes, upstream to the Base Node, in process 79 of FIG. 6. The Base Node (at data concentrator 4 of FIG. 1) can use that information in its management of the sub-network, including the re-assignment of the tree topology to group together those Service Nodes that are connected to the same phase of the power distribution system.

According to embodiments of this invention, the ability of a power line communications network node to identify the relative phase differences of the AC power waveform to which it is connected relative to other network nodes can be used to advantage in the configuration of that network node within the network. This phase detection can improve the selection of an upstream switch node through which the network node joins the power line communications network, particularly in a tree topology. In addition, this relative phase identification can be used in the reconfiguration or other management of the overall network. The phase detection circuitry and process can be readily implemented into power line communication modems and other circuitry in an efficient and cost-effective manner, and in a manner consistent with existing communications specifications and protocols, such as the PRIME PLC specification. In addition, embodiments of this invention are compatible in networks in which other nodes may not have phase detection capability.

While this invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of detecting a phase difference between service nodes in an alternating current (AC) power line communications network, comprising:
    at a first service node connected to a first phase of a plurality of phases in a power distribution grid, measuring a local zero crossing gap between a time at which the voltage at the first phase crosses a reference level and the start of a communications frame;
    receiving over the power line communications, from a second service node, data corresponding to a zero crossing gap at the second service node;
    deriving a zero crossing gap interval value corresponding to a difference between the received zero crossing gap and the local zero crossing gap; and
    comparing the zero crossing gap interval value with one or more threshold values to identify a phase relationship between the first service node and the second service node.

2. The method of claim 1, wherein the reference level is a DC level of an alternating current voltage at the first phase.

3. The method of claim 2, wherein the DC level is at a ground voltage at the first service node.

4. The method of claim 1, wherein the one or more threshold values comprise zero delay, a first multiple of one-third of a half-cycle period of an AC power waveform, and a second multiple of one-third of the half-cycle period of the AC power waveform, each threshold value having a tolerance band.

5. The method of claim 1, wherein the first service node receives a modulated communications signal, at the first phase, from a plurality of service nodes;
and further comprising:
    at the first service node, repeating the receiving, deriving, and comparing steps for each of the plurality of service nodes; and
    responsive to the comparing, selecting one of the plurality of service nodes to which to connect the first service node for registration in the communications network.

6. The method of claim 1, wherein the first service node receives, at the first phase, a modulated communications signal corresponding to a plurality of packets arranged in frames:
    and wherein the measuring step comprises:
        detecting a time at which the voltage at the first phase crosses the reference level;
        then advancing a digital counter responsive to a plurality of clock pulses; and
        outputting contents of the digital counter responsive to then detecting the start of a frame in the modulated signals received at the first phase.

7. The method of claim 1, wherein the first service node receives, at the first phase, a modulated communications signal corresponding to a plurality of packets arranged in frames:
    and wherein the measuring step comprises:
        detecting the start of a communications frame from communications signals received at the first phase;
        then advancing a digital counter responsive to a plurality of clock pulses; and
        outputting contents of the digital counter responsive to then detecting a time at which the voltage at the first phase crosses the reference level.

8. The method of claim 1, further comprising:
    identifying the phase to which the second service node is connected from the identified phase relationship; and
    communicating the identified phase of the second service node over the communications network.

9. The method of claim 1, wherein the data corresponding to the zero crossing gap at the second service node is communicated within encoded and modulated communications signals over the communications network.

10. The method of claim 9, further comprising:
    communicating packet data units over the communications network in the form of orthogonal frequency division modulated signals,
    wherein the data corresponding to the zero crossing gap are contained within one or more packet data units assigned to the second service node.

11. The method of claim 10,
    wherein the communications network is arranged according to a tree topology,
    wherein a base node and each service node at a branch point in the tree topology transmit a beacon packet data unit in assigned beacon slots in assigned frames of packet data units, and
    wherein the data corresponding to the zero crossing gap for a service node at a branch point are contained within the beacon packet data unit transmitted by that service node.

12. A network communications device for communication of data in the form of signals modulated onto an alternating current (AC) power distribution grid, comprising:
    a receiver coupled to one of a plurality of phase conductors and a neutral of the grid;
    processing circuitry coupled to the receiver, for processing the modulated signals received by the receiver, the modulated signals corresponding to a plurality of packet data units arranged in frames; and zero crossing detection circuitry, coupled to the phase conductor, for detecting a time at which a voltage at the phase conductor crosses a reference level, wherein the processing circuitry is also coupled to the zero crossing detection circuitry, and is for determining a zero crossing gap interval value between the time detected by the zero crossing detection circuitry and a time of the start of a frame received at the receiver, and wherein the processing circuitry is also for comparing the zero crossing gap interval with a zero crossing gap value communicated in the packet data units received at the receiver.

13. The device of claim 12, wherein the processing circuitry comprises:

programmable logic circuitry; and program memory, coupled to the programmable logic circuitry, for storing executable program constructions that, when executed by the programmable logic cause the programmable logic circuitry to perform a plurality of operations comprising:

demodulating and decoding signals received by the receiver to recover the digital data arranged in packet data units of a plurality of frames;

identifying a time of a start of a frame;

identifying the zero crossing gap interval as a time difference between the time detected by the zero crossing detection circuitry and the identified time at the start of the frame; and comparing the zero crossing gap interval value with one or more threshold values to identify a phase relationship between the phase of the phase conductor and that of first service node and another network communications device.

14. The device of claim 13, wherein the one or more threshold values comprise zero delay, a first multiple of one-third of a half-cycle period of an AC power waveform at the phase conductor, and a second multiple of one-third of the half-cycle period of the AC power waveform, each threshold value having a tolerance band.

15. The device of claim 13, further comprising:

a transmitter coupled to the phase conductor and to the processing circuitry, for transmitting signals modulated by the processing circuitry over the phase conductor;

and wherein the plurality of operations further comprises:

identifying the phase to which the other network communications device is connected from the identified phase relationship; and modulating signals for transmission, by the transmitter, corresponding to the identified phase of the other network communications device.

16. The device of claim 13, wherein the packet data units demodulated and decoded by the programmable logic circuitry correspond to signals communicated by a plurality of network communications devices in a communications network arranged according to a tree topology, wherein network communications devices at a base node and at branch points in the tree topology transmit a beacon packet data unit in assigned beacon slots in assigned frames of packet data units, and wherein the zero crossing gap value communicated in the packet data units are contained within the beacon packet data units.

17. The device of claim 12, wherein the receiver is connected to the phase conductor and to a neutral conductor, and is for detecting a voltage between the phase conductor and the neutral conductor, and wherein the reference level is the voltage at the neutral conductor.

* * * * *